United States Patent [19]

Colebrook et al.

[11] Patent Number: 5,115,520

[45] Date of Patent: May 26, 1992

[54] APPARATUS AND METHODS FOR SEALING A LEAKING TOILET TANK VALVE

[75] Inventors: Peter H. Colebrook, Bainbridge Is.; Jamil A. Razzak, Seattle; Robert H. Denkmann, Redmond; Alan A. Clifton, Lynnwood, all of Wash.

[73] Assignee: The Boeing Company, Seattle, Wash.

[21] Appl. No.: 567,459

[22] Filed: Aug. 15, 1990

[51] Int. Cl.$^5$ .............................. E03D 1/00
[52] U.S. Cl. .............................. 4/321; 4/323
[58] Field of Search .............. 4/300, 321, 323; 251/175

[56] References Cited

U.S. PATENT DOCUMENTS

| | | | |
|---|---|---|---|
| Re. 32,750 | 9/1988 | Grills et al. | 4/323 X |
| 3,307,633 | 3/1967 | Newall | 251/175 X |
| 3,429,554 | 2/1969 | Pro | 251/175 |
| 3,995,328 | 12/1976 | Carolan et al. | 4/316 |
| 4,086,670 | 5/1978 | Krause et al. | 4/295 |
| 4,114,203 | 9/1978 | Carolan | 4/323 X |
| 4,202,061 | 5/1980 | Waters | 4/321 X |
| 4,262,878 | 4/1981 | O'ffill | 251/175 |
| 4,275,470 | 6/1981 | Badger et al. | 4/316 |
| 4,332,041 | 6/1982 | Kristoffersen | 4/323 X |
| 4,357,719 | 11/1982 | Badger et al. | 4/323 X |
| 4,460,155 | 7/1984 | Smith | 251/175 X |
| 4,521,925 | 6/1985 | Chen et al. | 4/323 X |
| 4,603,709 | 8/1986 | Huisma | 4/323 X |

Primary Examiner—Henry J. Recla
Assistant Examiner—Robert M. Fetsuga
Attorney, Agent, or Firm—R. H. Sproule; B. A. Donahue

[57] ABSTRACT

An aircraft toilet system includes a holding tank and a discharge pipe which extends to a service panel located near the skin of the aircraft. A poppet valve is located near the outlet end of the discharge pipe. Leakage of fluids past the poppet valve is corrected in a first embodiment by pressurized cabin air which is ported to a downstream side of the poppet valve and by venting the upstream side of the valve to the atmosphere. In a second embodiment, high pressure air from the aircraft's environment control system is ported to the downstream side of the valve. The resulting pressure differential holds the valve against its seat, and prevents fluid leakage in the event of a damaged valve seal.

12 Claims, 4 Drawing Sheets

APPARATUS AND METHODS FOR SEALING A LEAKING TOILET TANK VALVE

TECHNICAL FIELD

The present invention pertains to apparatus and methods for preventing leakage from an aircraft toilet waste holding tank.

BACKGROUND OF THE INVENTION

On some aircraft there can develop a problem known as "blue ice". Blue ice typically results when the blue dye rinse water used in many aircraft toilets leaks out to locations at or near the skin of the aircraft and freezes while the aircraft is in flight. There is a danger that as the blue ice builds up on the skin of the aircraft that it eventually may break off and be ingested into an aircraft engine. In addition, blue stains may be formed on the fuselage and ramp area when the aircraft is on the ground.

On aircraft having gravity feed toilets, the waste holding tank located beneath each toilet is emptied by maintenance personnel on the ground via an evacuation pipe connected between the bottom of the holding tank and the skin of the aircraft. There is typically a first valve located in the evacuation pipe near the outlet from the holding tank and a second valve located near the skin of the aircraft. When both of these valves leak, blue water is permitted to reach the skin of the aircraft and freeze.

A number of waste water holding systems have been disclosed. For example, U.S. Pat. Nos. 4,275,470 and 4,357,719 both by Badger et al disclose an aircraft vacuum flush toilet which uses a vacuum (ambient pressure) to aid in opening a flush valve and pressure (cabin pressure) to hold the flush valve closed. Furthermore, U.S. Pat. No. 4,332,041 by Kristoffersen discloses a vacuum toilet system which uses a vacuum pump to suck waste from a toilet bowl into a waste holding tank and a blower to pressurize the waste holding tank to blow waste out of the tank when being serviced.

SUMMARY OF THE INVENTION

The present invention pertains to an aircraft toilet system which includes a receptacle located inside the aircraft cabin for receiving toilet waste, as well as a tank, in pressure equalization with the receptacle, for holding the toilet waste. Also included is a discharge pipe for conducting the waste from the holding tank to an evacuation outlet located near the exterior of the aircraft. A cover is located at the evacuation outlet for preventing unwanted discharge of the waste from the discharge pipe. In addition, there is a valve located upstream of the cover in a manner that the discharge pipe, the cover and the valve form an enclosure. There is a source of pressurized air located within the aircraft and a conduit connected between the pressurized air source and the enclosure so that the downstream side of the valve is caused to be pressurized via the conduit so as to hold the valve in the closed position.

BRIEF DESCRIPTION OF THE DRAWINGS

The present invention will be described in more detail in the following Detailed Description in conjunction with the attached drawings, in which.

DETAILED DESCRIPTION

The present invention pertains to apparatus for Preventing unwanted leakage of fluids from the waste holding tank of an aircraft toilet system. Before proceeding with a description of the present invention, a brief discussion of conventional toilet systems and the problems of fluids leaking from these systems will be discussed.

Figure 1:
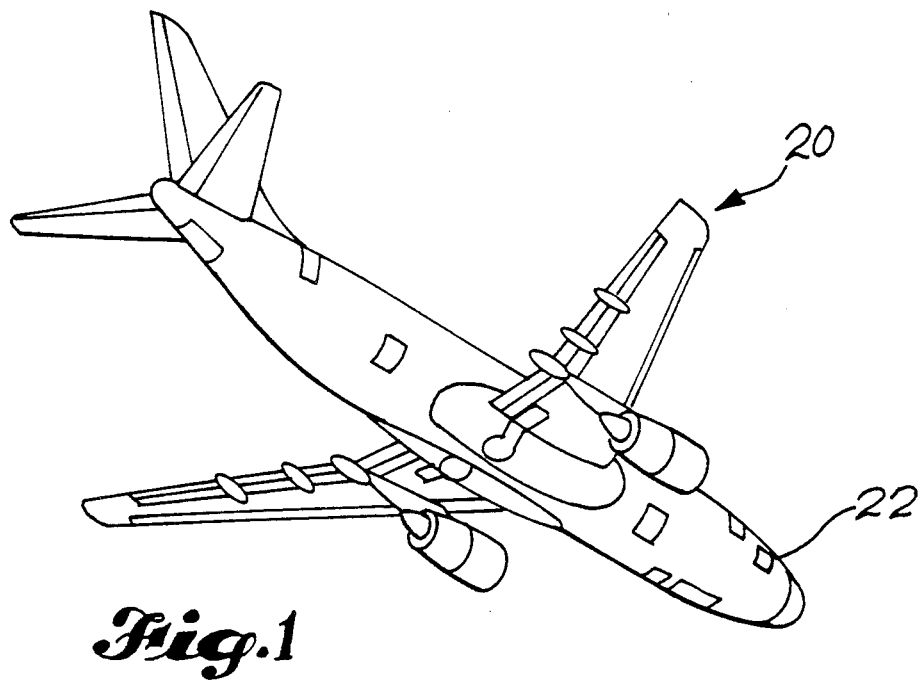
FIG. 1 is a drawing of a passenger aircraft showing a typical location of a service panel for evacuating waste from an aircraft holding tank.
Figure 2:
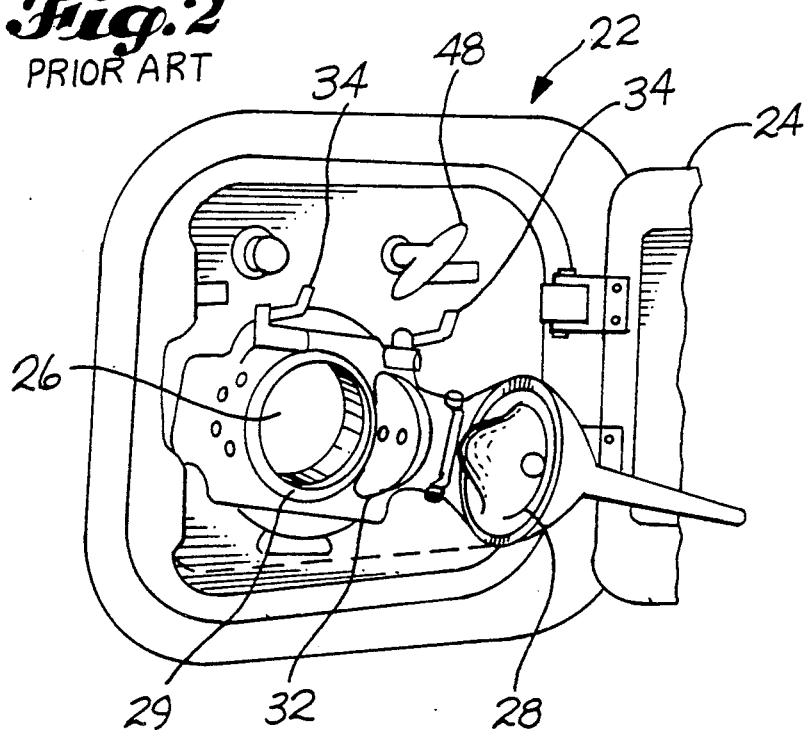
FIG. 2 is an isometric view of a conventional service panel for evacuating waste from an aircraft holding tank.
Figure 3:
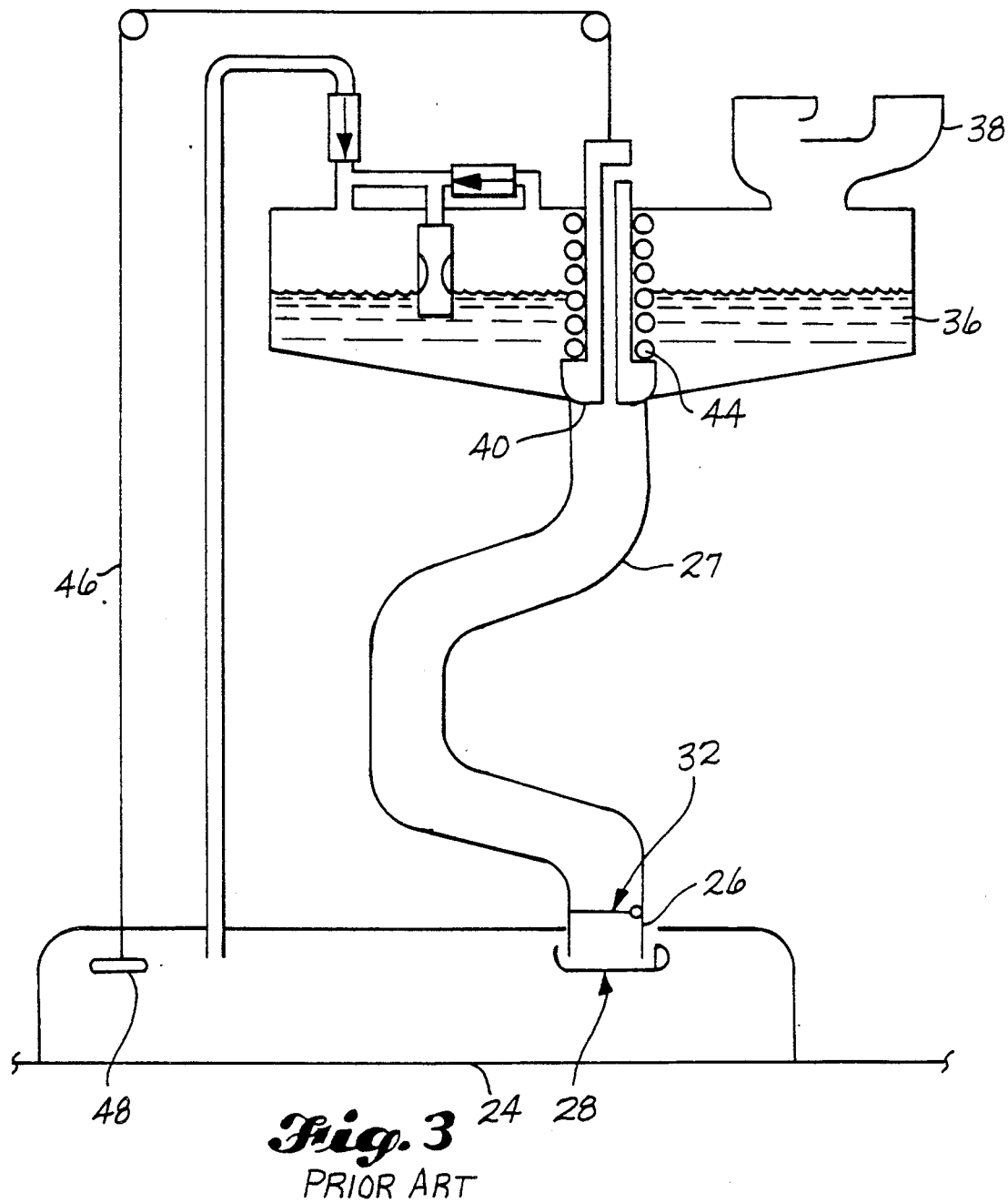
FIG. 3 is a schematic representation of a conventional gravity drain aircraft toilet system.

Referring first to FIG. 1 there is shown an aircraft indicated at 20 which includes a forward service panel indicated at 22 shown more clearly in FIG. 2. The aircraft also includes an aft service panel (not shown) which is identical to the forward service panel. The service panel includes a hinged door 24 (only a portion of which is shown) which is latched closed during flight and which is opened by maintenance personnel on the ground to access an outlet 26 to a drain pipe 27 (FIG. 3). The drain outlet 26 is sealed by a cap 28 and locked by means of a handle 30. The normal procedure practiced by maintenance personnel is to open the cap 28 and attach a waste recovery hose (not shown) to the outlet. The waste in a holding tank 36 located inside the aircraft is drained into a portable tank (also not shown). To prevent waste liquid from being discharged onto the ground when the cap 28 is opened, a hinged poppet valve 32 is located inside the outlet behind the cap 28. The poppet valve 32 closes against a valve seat 29. The valve 32 may be Pivoted between an open position (shown in FIG. 2) and a closed position by means of levers 34 after the evacuation hose has been attached.

As shown more clearly in FIG. 3, the waste holding tank 36, which is located beneath a toilet 38, includes an outlet opening 40 in the bottom of the tank to which the discharge pipe 27 is connected. To prevent unwanted discharge of waste liquid into the discharge pipe, the holding tank includes a second valve 44 which is opened by a cable 46 which is attached to a pull handle 48. Thus, when the evacuation hose is connected to the discharge pipe, the valves 32 and 44 are opened, and the waste is removed from the holding tank 36.

Figure 4:
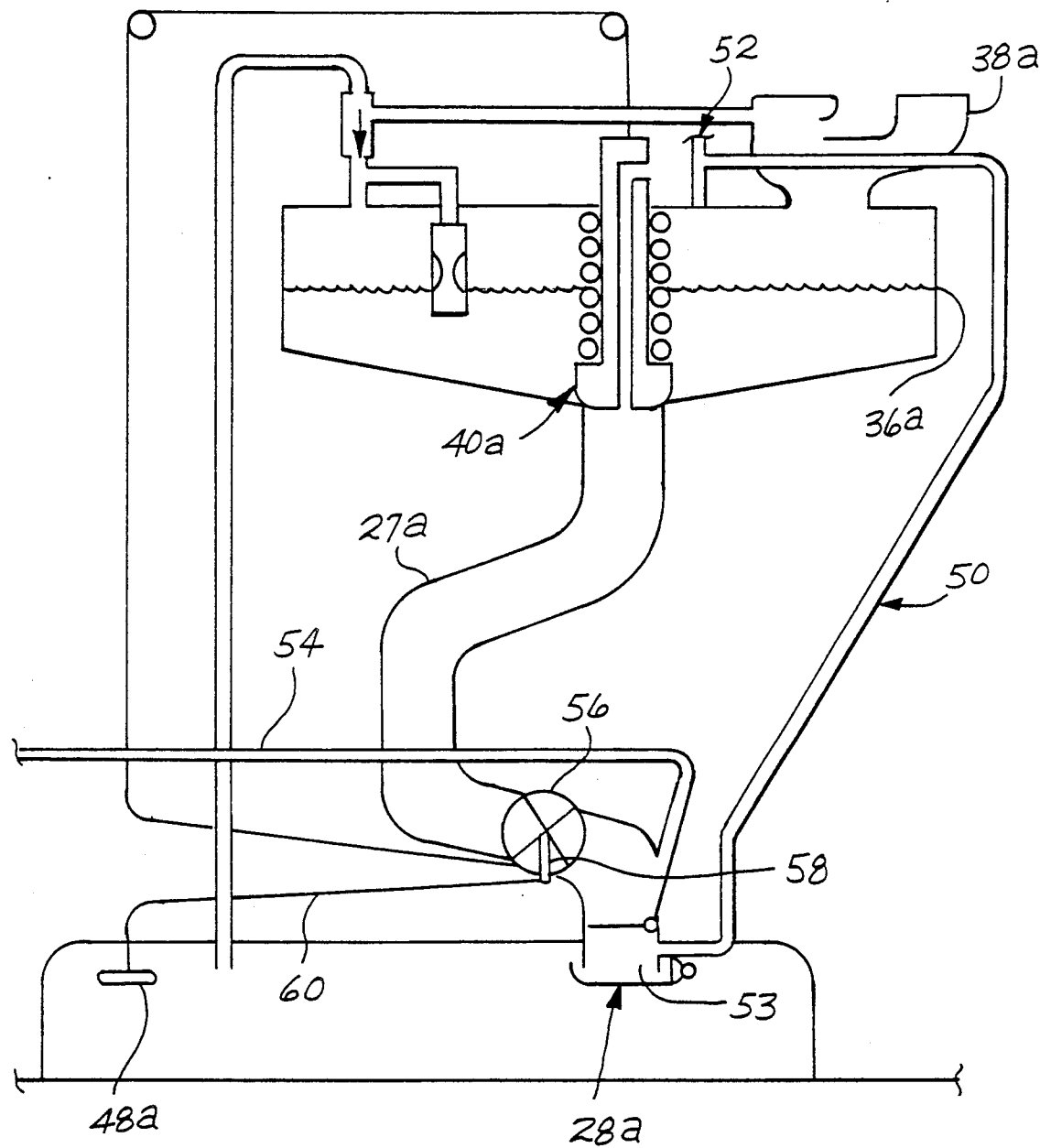
FIG. 4 is a schematic representation of a gravity drain aircraft toilet system which includes a first embodiment of the present invention.

As mentioned previously, blue ice develops due to fluid leakage around the holding tank valve 40 and the outlet valve 32 and outside the panel access door 24. In order to overcome this Problem, there is provided as shown in FIG. 4 a first embodiment of the present invention wherein like elements described previously are identified by like numerals with the suffix "a" attached. In the present embodiment, a pressure line 50 is connected between a location downstream of and in close proximity to the outlet valve 32 a and a vent pipe 52 extending from the top of the holding tank 36a. In this manner, when the holding tank is pressurized due to pressure of the aircraft, this pressurization appears at the downstream side of the valve 32a hold it tightly against its valve seat. More specifically, an enclosure 53 formed by the outlet end of pipe 27a, the outlet cover 28a and the valve 32a is pressure equalized by the vent line 50 with the holding tank 36a.

Furthermore, there is provided a vent pipe 54 connected between the drain discharge pipe 27a at a location upstream of, but in close proximity to, the valve 32a and an outlet (not shown) located at the skin of the aircraft. When the aircraft is airborne, the resulting lower ambient pressure appears at the upstream side of the valve 32a. In this manner, the total pressure differential across the valve 32a holds it against its valve seat preventing liquid leakage.

In order to further prevent unwanted leakage of waste liquid, there is provided a conventional ball valve 56 (FIG. 4) which is located in the discharge pipe 27a upsteam of the vent opening 54 and downstream of the tank dump valve 40a. If any fluid leaks past the ball valve 56, it is evacuated by the vent line 54. The ball valve 56 includes a handle 58 to which there is attached a cable 60 which extends from the dump handle 48a and which also is attacked to the dump valve 40a. When the ground personnel operate the dump handle 48a to empty the contents of the waste tank, valves 40a and 56 open simultaneously to permit the release of the liquid waste from the tank.

Figure 5:
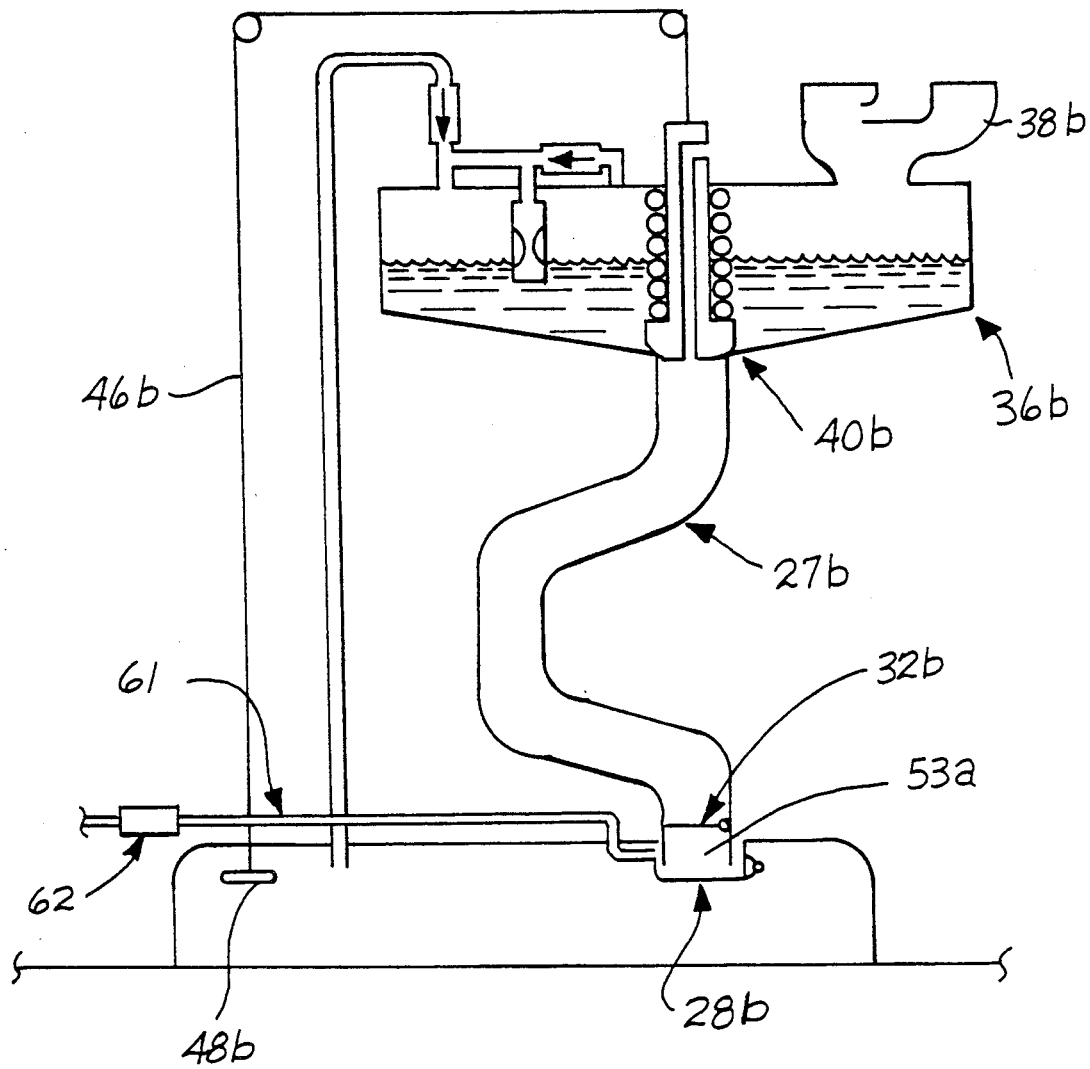
FIG. 5 is a schematic representation of a gravity drain aircraft toilet system which includes a second embodiment of the present invention.

In another embodiment of the present invention shown in FIG. 5, like elements described in previous embodiments are assigned like numerals with the suffix "b" attached. In the present embodiment there is provided a pneumatic duct 61 which is connected to the enclosure 53a. The pneumatic line 61 is tied into an aircraft high pressure line, such as a conventional environmental control system line (not shown), and includes a pressure regulator 62 which lowers the pressure to between ten and twenty psi. This causes the enclosure 53a to become pressurized thereby holding the valve 32b against its seat and preventing fluid leakage in the event of a damaged seal. The pneumatic line 61 also includes a check valve (not shown) and orifice at a connection point of the pneumatic line to the environmental control system pneumatic duct to prevent backflow and limit discharge flow rate in case of line breakage.

What is claimed is:

1. A method of sealing a leaking aircraft toilet valve which is located inside a conduit extending between a waste holding tank and an evacuation outlet located near the exterior of the aircraft, the method comprising the steps of:
   a. conducting air from a location inside the holding tank to a first side of the valve;
   b. pressurizing the air in the holding tank as a result of the holding tank being in fluid communication with air in a passenger compartment of the aircraft which is pressurized;
   c. venting air from a second side of the valve to the atmosphere such that a pressure at the second side of the valve is reduced due to the aircraft being in flight; and
   d. urging the valve toward a closed position due to a pressure differential across the valve resulting from the pressurizing and venting steps.

2. A fluid waste system for an aircraft having a pressurized compartment, the system comprising:
   a. means for receiving fluid waste;
   b. an evacuation outlet;
   c. a discharge pipe connected between the waste receiving means and the evacuation outlet for conducting the fluid waste from the waste receiving means to the evacuation outlet;
   d. A cover sealingly mounted on the evacuation outlet for preventing discharge of the waste from the discharge pipe;
   e. a valve mounted in the discharge pipe located upstream of the cover in a manner that the discharge pipe, the cover and the valve form an enclosure, the valve including a first side and a second side; and
   f. a first conduit connected between the discharge pipe at a location upstream of the valve and a location in the aircraft which is in communication with the atmosphere so that an ambient pressure existing while the aircraft is in flight is transmitted to the second side of the valve so as to urge the valve toward the closed position.

3. The system as set forth in claim 2 additionally comprising a second conduit in communication with the pressurized compartment of the aircraft and the enclosure so that when the compartment is pressurized the first side of the valve is caused to be pressure equalized with the compartment via the first conduit so as to urge the valve toward a closed position.

4. The system as set forth in claim 2 wherein the pressurized compartment is the waste receiving means.

5. A fluid waste system for an aircraft, the system comprising:
   a. means for receiving fluid waste;
   b. an evacuation outlet;
   c. a discharge pipe connected between the waste receiving means and the evacuation outlet for conducting the fluid waste from the waste receiving means to the evacuation outlet;
   d. a cover sealingly mounted on the evacuation outlet for preventing discharge of the waste from the discharge pipe;
   e. A valve, including a first side and a second side, mounted in the discharge pipe located upstream of the cover in a manner that the discharge pipe, the cover and the first side of the valve form an enclosure; and
   f. a conduit connected between the discharge pipe at a location upstream of the valve and a location in fluid communication with the atmosphere so that an ambient pressure existing while the aircraft is in flight is transmitted to the second side of the valve so as to urge the valve toward a closed position.

6. A fluid waste system for an aircraft, the system comprising:
   a. means for receiving the fluid waste;
   b. an evacuation outlet;
   c. a discharge pipe connected between the waste receiving means and the evacuation outlet for conducting the fluid waste from the waste receiving means to the evacuation outlet;
   d. a cover sealingly mounted on the evacuation outlet;
   e. a valve, including a first side and a second side, mounted in the discharge pipe located upstream of the cover in a manner that the discharge pipe, the cover and the valve form an enclosure; and
   f. a first conduit connected between the discharge pipe at a location upstream of the valve and a location on the aircraft in fluid in communication with the atmosphere so that an ambient pressure existing while the aircraft is in flight is transmitted to the second side of the valve so that the pressure on the second side of the valve is less than the pressure in the enclosure thereby urging the valve to a closed position.

7. The system as set forth in claim 6 additionally comprising:
   a. a source of pressurized air located within the aircraft; and
   b. a second conduit in communication with the pressure air source and the enclosure so that the first side of the valve is caused to be pressure equalized with the pressurized as source via the second conduit so as to urge the valve toward a closed position.

8. A fluid waste system for an aircraft, the system comprising:
   a. means for receiving fluid waste;
   b. A closable evacuation outlet;
   c. a discharge pipe connected between the waste receiving means and the evacuation outlet for conducting the fluid waste from the waste receiving means to the evacuation outlet;
   d. a valve mounted in the discharge pipe, the valve including a first side and a second side; and
   e. a source of pressurized air located within the aircraft;
   f. a first conduit connected between the discharge pipe at a location upstream of the valve and a location on the aircraft in fluid communication with the atmosphere so that an ambient pressure existing while the aircraft is in flight is transmitted to the second side of the valve so as to urge the valve toward a closed position; and
   g. a second conduit in fluid communication with the pressurized air source and the discharge pipe at a location in fluid communication with the first side of the valve so that the first side of the valve is caused to be pressure equalized with the pressurized air source so as to urge the valve toward a closed position.

9. A fluid waste system for an aircraft, the system comprising:
   a. means for receiving fluid waste;
   b. an evacuation outlet;
   c. a discharge pipe connected between the waste receiving means and the evacuation outlet for conducting the fluid waste from the waste receiving means to the evacuation outlet;
   d. a valve mounted in the discharge pipe, the valve including a first side and a second side; and
   e. a conduit connected between the discharge pipe at a location upstream of the valve and a location on the aircraft in fluid in communication with the atmosphere so that an ambient pressure existing while the aircraft is in flight is transmitted to the second side of the valve so that the pressure on the second side of the valve is less than a pressure on the first side of the valve thereby urging the valve to a closed position.

10. A fluid waste system for an aircraft, the system comprising:
    a. means for receiving fluid waste;
    b. a closable evacuation outlet;
    c. a discharge pipe connected between the waste receiving means and the evacuation outlet for conducting the fluid waste from the waste receiving means to the evacuation outlet;
    d. a valve mounted to the discharge pipe, the valve including a first side and a second side;
    e. a source of pressurized air located within the aircraft;
    f. a first conduit connected between the discharge pipe at a location upstream of the valve and a location on the aircraft in fluid in communication with the atmosphere so that an ambient pressure existing while the aircraft is in flight is transmitted to the second side of the valve so that the pressure on the second side of the valve is less than a pressure on the first side of the valve thereby urging the valve to a closed position; and
    g. a second conduit in fluid communication with the pressurized air source and the discharge pipe at a location in fluid communication with the first side of the valve so that the first side of the valve is caused to be pressure equalized with the pressurized air source so as to urge the valve toward a closed position.

11. A method of sealing an aircraft waste system valve having a first side and a second side, the method comprising the steps of:
    a. providing a conduit for evacuating fluid waste, the conduit containing the valve and extending between a waste receptacle and an evacuation outlet;
    b. venting air from a second side of the valve to the atmosphere such that a pressure at the second side of the valve is less than a pressure at a first side of the valve due to the aircraft being in flight;
    c. urging the valve toward a closed position as a result of a lesser pressure at the second side of the valve than at the first side of the valve due to the venting step.

12. A method of sealing an aircraft waste system valve having a first side and a second side, the method comprising the steps of:
    a. providing a conduit for evacuating fluid waste, the conduit containing the valve and extending between a waste receptacle and an evacuation outlet;
    b. pressurizing a portion of the aircraft;
    c. equalizing the pressure between the pressurized portion of the aircraft and the first side of the valve via a conduit which is in fluid communication with the pressurized portion of the aircraft and the first side of the valve;
    d. venting air from the second side of the valve to the atmosphere such that a pressure at the second side of the valve due to the aircraft being in flight is less than a pressure at the first side of the valve; and
    e. urging the valve toward a closed position due to the pressure differential across the valve resulting from the pressure equalizing and venting steps.

* * * * *